US011244329B2

(12) United States Patent
Theocharous et al.

(10) Patent No.: US 11,244,329 B2
(45) Date of Patent: Feb. 8, 2022

(54) METRIC FORECASTING IN A DIGITAL MEDIUM ENVIRONMENT

(71) Applicant: Adobe Inc., San Jose, CA (US)

(72) Inventors: Georgios Theocharous, San Jose, CA (US); Trevor H. Paulsen, Lehi, UT (US)

(73) Assignee: Adobe Inc., San Jose, CA (US)

( * ) Notice: Subject to any disclaimer, the term of this patent is extended or adjusted under 35 U.S.C. 154(b) by 1184 days.

(21) Appl. No.: 15/413,892

(22) Filed: Jan. 24, 2017

(65) Prior Publication Data

US 2018/0211266 A1 Jul. 26, 2018

(51) Int. Cl.
*G06Q 30/02* (2012.01)
*G06Q 10/10* (2012.01)

(52) U.S. Cl.
CPC ....... *G06Q 30/0202* (2013.01); *G06Q 10/109* (2013.01)

(58) Field of Classification Search
None
See application file for complete search history.

(56) References Cited

U.S. PATENT DOCUMENTS

2017/0220672 A1* 8/2017 Sainani ............... G06N 20/00
2017/0220938 A1* 8/2017 Sainani ............... G06F 16/2428
2017/0235848 A1* 8/2017 Van Dusen ............ G06F 30/20
    705/12
2017/0364933 A1* 12/2017 Chen ................ G06Q 10/067
2019/0198152 A1* 6/2019 Hakansson ............ G16H 40/63

OTHER PUBLICATIONS

Philippot, Olivier, Alain Anglade, and Thierry Leboucq. "Characterization of the energy consumption of websites: Impact of website implementation on resource consumption." (2014): 171-178. (Year: 2014).*
Hyndman,"Forecasting Functions for Time Series and Linear Models", R package version 7.3, Oct. 13, 2016, 105 pages.
Hyndman,"Automatic Time Series Forecasting: The forecast Package for R", Journal of Statistical Software, 26(3):1{22, 2008., Jul. 29, 2008, 22 pages.

* cited by examiner

Primary Examiner — Thomas L Mansfield
(74) Attorney, Agent, or Firm — FIG. 1 Patents

(57) ABSTRACT

Metric forecasting techniques in a digital medium environment are described. A time series interval is identified by an analytics system that is exhibited by input usage data. The input usage data describes values of a metric involved in the provision of the digital content by a service provider system. A determination is then made by the analytics system as to whether historical usage data includes the identified time series interval. A forecast model is then selected by the analytics system from a plurality of forecast models based on a result of the determination and the identified time series interval. Forecast data is then generated by a forecast module of the analytics system. The forecast data is configured to predict at least one value of the metric based on the selected forecast model, a result of the determination, and the input usage data.

19 Claims, 6 Drawing Sheets

400

Algorithm Forecasting
Input: *metric.data*: a time series signal
  *metricref.data*: a time series signal from last year
  *matching.periods*: index from this year to last year
  *matching.special.days*: matching indexes of scheduled time periods (e.g., special days/holidays)
  *frcst.periods*: number of periods to forecast.
  *prediction.level*: prediction level (e.g., accuracy)
  *granularity*: day, hour, week, month
Output: *frcst*: mean forecast value over the forecast periods
  *upper*: upper prediction interval
  *lower*: lower prediction interval
1:  [ *data.series, SEASONAL*] = *season(metric.data, granularity)* {Set seasonality period of metric.data, based on granularity and length of the data, for hour, 7 for day, 52 for week and 12 for month}
2:  if *matching.periods* ≠ *NULL* then
3:    *last.year.data* = *metricref.data[matching.periods]*
4:    if matching.special.days ≠ *NULL* then
5:      *last.year.data[matching.special.days]* = *metricref.data[matching.special.days]*
6:    end if
7:    *fit* = *auto.arima(metric.data, last.year.data)* {Fit for year over year seasonality}
8:  else
9:    if *granularity* = *day* then
10:      *fit* = *ets(metric.data)*
11:    end if
12:    if (*granularity* = (*hour* ∨ *week* ∨ *month*) ∧ *SEASONAL* = *TRUE*) then
13:      *fit* = *stlm(data.series, modelfunction* = *auto.arima)*
14:    end if
15:    if (*granularity* = (*hour* ∨ *week* ∨ *month*) ∧ *SEASONAL* = *FALSE*) then
16:      *fit* = *auto.arima(data.series)*
17:    end if
18:  end if
19:  [*frcst, upper, lower*] = *forecast(fit, frcst.periods, prediction.level)*

Fig. 4

METRIC FORECASTING IN A DIGITAL MEDIUM ENVIRONMENT

BACKGROUND

Analytics systems have been developed to collect and analyze large sets of data to identify trends, patterns, and correlations in the data that are not readily observable by humans due to the amount of data. In one example of analysis performed by an analytics system, a variety of additional insights are gained into operation of a service provider system within a digital medium environment, such as a web service, online provider of goods and services, and so forth. In a digital marketing scenario, for instance, this may be used to identify segments (e.g., subsets) of a user population in order to target digital marketing content to increase a likelihood of conversion. Other examples include insights into computational resource consumption by the service provider system, tracking of expenses and revenue, number of visitors to a web service, page views, and so forth.

Conventional analytics systems support a variety of techniques by which a user may interact with the data in order to gain access to this insight provided by the analytics system, such as to evaluate values of different metrics described in the analytics data via a user interface. A user, for instance, may interact with the user interface of the analytics system to view different combinations of metrics that have been correlated by the system, values of those metrics, trends exhibited by the values of those metrics and correlated metrics, and so on. However, conventional analytics systems rely on a view of the values of the metrics going back in time in order to provide insight as to what has occurred, but not what may occur. As such, conventional analytics systems provide a limited ability, if at all, to gain insight into what may occur in the future regarding the values of the metrics.

SUMMARY

Metric forecasting techniques in a digital medium environment are described in which forecast data is generated that predicts a value of a metric involving provision of digital content by a service provider system. In this way, insight may be gained into future operations of the service provider system, such as number of visitors, computational resource consumption, revenue, expenses, digital content consumption, and other metrics.

In one example, a time series interval is identified by an analytics system that is exhibited by input usage data, e.g., hour, day, week, month, year. The input usage data describes values of a metric involved in the provision of the digital content by a service provider system, such as traffic, computational resource consumption, and so forth.

A determination is then made by the analytics system as to whether historical usage data includes the identified time series interval. For example, a user may interact with the input usage data in a user interface to view trends, correlations, and patterns exhibited by values of metrics. The analytics system may then determine whether historical usage data is available that also includes a corresponding time interval, which may be used to bolster accuracy of a prediction. In an example, the usage data forms disjoint non-continuous sets of data and as such supports increased forecast accuracy, reduced computational resource consumption, and real time output.

A forecast model is then selected by the analytics system from a plurality of forecast models based on a result of the determination and the identified time series interval. In this way, the forecast model may adapt to temporal granularity of usage data that is to be used as a basis to forecast values of metrics. This selection may also take into account whether the data included scheduled time periods, such as holidays, to further increase accuracy of a forecast.

Forecast data is then generated by a forecast module of the analytics system. The forecast data is configured to predict at least one value of the metric based on the selected forecast model, a result of the determination, and the input usage data. This is performed by fitting the selected forecast model to the available usage data. The generated forecast data is then output by the analytics system, e.g., in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 4 depicts an example of an algorithm that may be employed by a model selection module of FIG. 3 to select one of the plurality of forecast models.

DETAILED DESCRIPTION

Overview

Figure 1:
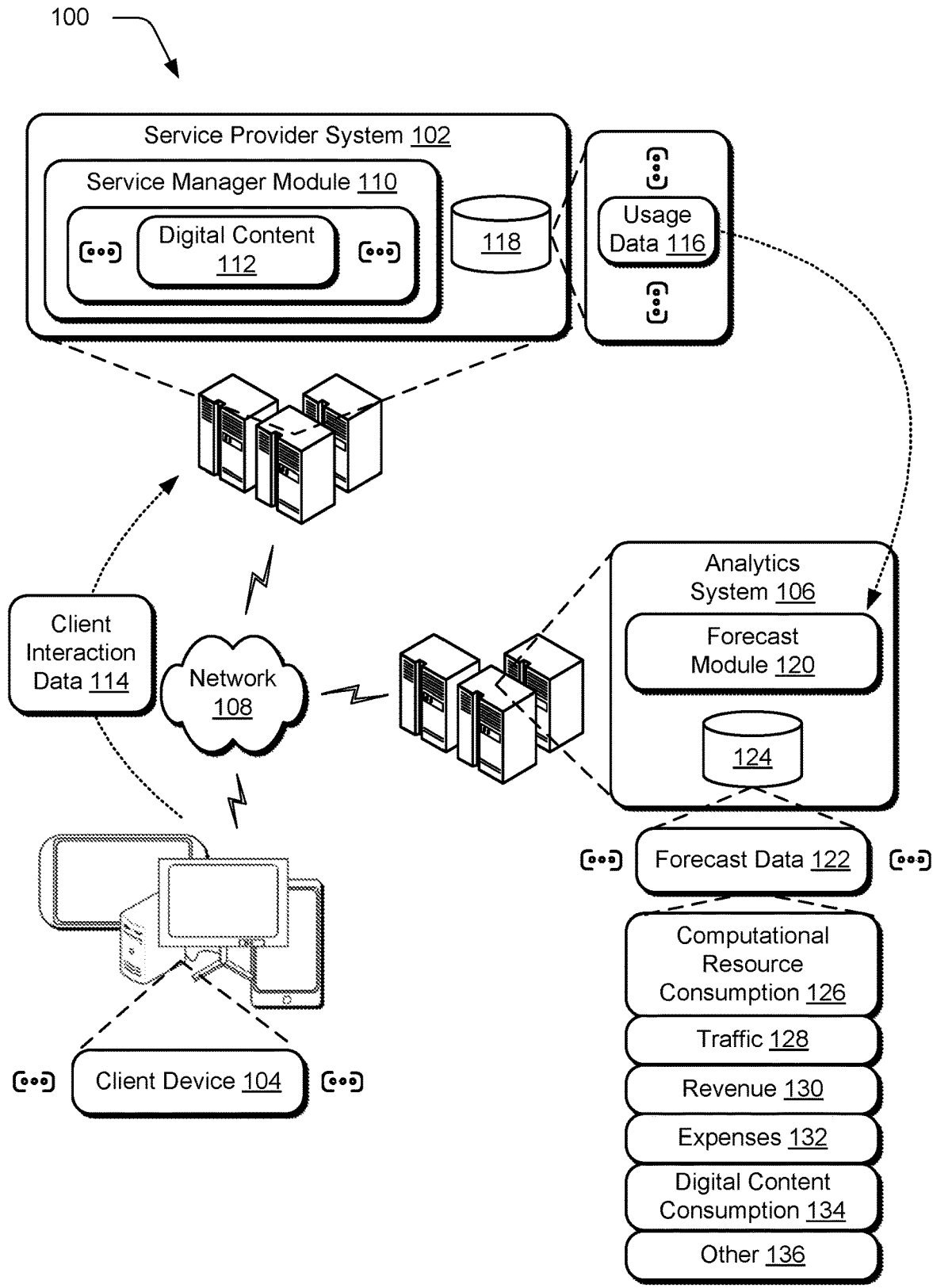
FIG. 1 is an illustration of an environment in an example implementation that is operable to employ metric forecast techniques described herein.

Analytics systems may be used to give a variety of insights into operation of a service provider system based on correlations, trends, and patterns exhibited by data collected from the service provider system. Conventional analytics systems, however, provide these insights as going back in time and do not support functionality to forecast into the future. As a result, techniques supported by conventional analytics system are limited to a view of what has occurred and do not address what may yet occur. Thus, these conventional techniques provide limited support in planning for future operation of the service provider system.

Accordingly, metric forecasting techniques and systems in a digital medium environment are described in which forecast data is generated to predict values for metrics involving provision of digital content by a service provider system. The service provider system, for instance, may be configured to provide digital content as an online application (e.g., for subscription based access), provide opportunities to purchase a good or service, online storage, or other web service that is accessible via a network.

Operation of the service provider system in providing this access to the digital content may be described in usage data using a variety of metrics and values of those metrics. Metrics include any characteristic that may be described in the operation of the service provider system to provide the digital content for access via the network. Examples of metrics include computational resource consumption (e.g., storage, network, or processing), traffic (e.g., a number of visitors, page views), revenue, expenses, conversion rate, and so forth.

A variety of techniques may be employed by an analytics system to generate forecast data that predicts future values of these metrics. In one example, the analytics system employs disjoint (i.e., non-continuous) sets of the usage data based on a level of temporal granularity to be used for a prediction. Examples of different levels of temporal granularity (i.e., intervals of time) include hourly, daily, weekly, monthly, quarterly, yearly, and so forth.

To begin, the analytics system may receive input usage data to initiate a forecast of a future value of a metric. The user, for instance, may select different metrics via interaction with a user interface of the analytics systems to observe trends exhibited by usage data of a service provider, correlations between metrics, values of those metrics, and so forth. During this interaction, the analytics system generates forecast data for values for those metrics, with which, the user is interacting and outputs that forecast data in real time in the user interface. Thus, the input usage data may be defined by the data being viewed by the user via the user interface. From this, forecast data is generated and output in real time automatically and without user intervention by the analytics system as a layer of additional functionality "over" the interaction of the user with the analytics system. In one example, the user may be provided with a simultaneous view in the user interface as to what has occurred (e.g., through interaction with particular metrics of the input usage data) and a forecast as to what may occur based on these metrics by viewing the forecast data. A variety of other examples are also contemplated including user specification of at least one metric and the time interval to be predicted as described in further detail in the following sections.

In an implementation, the analytics system collects temporally disjoint (i.e., non-continuous) sets of the usage data based on a level of granularity exhibited by the input usage data. The analytics system, for instance, may determine that the input usage data in the user interface above corresponds to the month of April. Based on this, the analytics system identifies historical usage data from a previous year that also corresponds to the month of April, and does not include intervening months and this is disjoint and non-continuous. The usage data from both the input usage data and the historical usage data then serve as a basis to generate the forecast data by the analytics system. In this way, usage data is employed that has an increased likelihood of accurately describing the interval of time under consideration as identified by the analytics system from the input usage data. This results in an increase in accuracy of the analytics system in generating the forecast data by ignoring usage data that could lead to inaccuracies (e.g., data from intervening weeks), reduces computational resource consumption by the analytics system, and may support real time generation of the forecast. Other examples are also contemplated, such as to collect disjoint sets based on a user-specified time interval.

Scheduled periods of time (e.g., calendared holidays, times of day such as lunch time, and so forth) may also be addressed as part of this collection. Continuing with the previous example, the analytics system determines that the month of April as described by the input usage data includes a holiday, e.g., Easter. However, Easter does not occur in the month of April in each year. Accordingly, the analytics system also ensures that the data collected also includes usage data of that holiday (e.g., Easter) even if taken from a different month. In this way, the usage data that is collected has an increased likelihood of accurately reflecting similar situations encountered by the service provider system and thus increases a likelihood of accuracy in the forecast.

The analytics system then selects a forecast model from a plurality of forecast models. The selection may be based on the temporal granularity (e.g., amount of time included in a specified time interval) as well as availability of the historical usage data in describing the time interval. The analytics system, for instance, may select between forecast models based on whether the usage data is identified as having a temporal granularity of week, day, month, year, and so forth. The analytics system may also take into account whether this data includes a scheduled time period (e.g., calendared holiday, time of day such as "lunch," etc.) as part of the selection such that different forecast models are selected based on whether the data includes the scheduled time period. A variety of different types of forecast models may be employed by the analytics system as further described in relation to FIG. 3.

The analytics system then employs the selected model to generate forecast data to predict a value for a metric based on the input and historical data that is available, e.g., expected number of visitors to a website, computational resource consumption, revenue, expenses, page views, and so on. In this way, the analytics system provides a forecast solution that takes into account temporal granularity, e.g., hourly, daily, week, monthly, and so forth. Further, the analytics system also takes into account what data is available in making this selection as well as scheduled time period (e.g., calendared holidays) that may be included in the data in generating the forecast data. In this way, the analytics system may automatically adapt to temporal granularity, availability of usage data, and support real time output as further described in the following sections.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ metric forecasting techniques described herein. The illustrated environment 100 includes a service provider system 102, a client device 104, and an analytics system 106 that are communicatively coupled, one to another, via a network 108. Computing devices that implement the service provider system 102, the client device 104, and the analytics system 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider and analytics systems 102, 106 and as further described in FIG. 6.

The service provider system 102 is illustrated as including a service manager module 110 that is implemented at least partially in hardware of a computing device. The service manager module 110 is configured to manage online interaction of the client device 104 with digital content 112 of the service provider system 102 via the network 108. As previously described, the digital content 112 may take a variety of forms, such as an online application, online storage, web service, digital images, digital audio, multimedia, and so forth. Thus, client interaction data 114 communicated via the network 108 involving interaction with the digital content 112 by the client device 104 via the network 108 may also take a variety of forms, such as selection of a menu item, voice command, gesture, selection of a hyperlink, and so forth.

A user of client device 104, for instance, may create the digital content 112 by accessing the service manager module 110 via the network 108, such as to create an illustration, movie, audio data, and so forth. This may include execution of applications locally by the client device 104 and remotely by the service provider system 102 that both involve actions taken with respect to the digital content 112. As part of this, a user of the client device 104 may initiate operations involving interaction with the digital content 112, such as to draw a line, color a shape, enter text, and so forth. Thus, initiation of these operations is considered performance of an action involving interaction with the digital content 112. Other examples are also contemplated in which the digital content 112 is an application, web service, and so forth and thus different interactions with the digital content 112 (e.g., a user interface of the digital content 112) also correspond to different actions, e.g., selection of a link, an item in a user interface, and so forth.

The service manager module 110 is configured to generate usage data 116, illustrated as stored in storage 118, that describes provision of the digital content 112 that supports this interaction. The usage data 116, for instance, may describe interactions of the client device 104 with the digital content 112 as described above. This may be reflected as a number of visitors, page views, and so forth. The usage data 116 may also describe operation of the service provider system 102 performed in the provision of the digital content 112, such as hardware resources (e.g., processing system, computer-readable storage media, network), software resources, revenue collected, expenses occurred, and so forth.

The usage data 116 is this example is then collected by the analytics system 106 via the network 108. The analytics system 106 includes a forecast module 120 that is implemented at least partially in hardware of a computing device (e.g., a processing system and computer readable storage medium) to generate forecast data 122 from the usage data 116, which is illustrated as stored in storage 124. The forecast data 122 is configured to predict future values for metrics involving provision of the digital content 112 by the service provider system 102.

The forecast data 122, for instance, may be configured to predict future values of computational resource consumption 126 by the service provider system 102. Computational resource consumption 126 may include an amount of processing (e.g., servers, cores, CPUs), memory (e.g., RAM, persistent storage), network (e.g., bandwidth, spikes) resources used by the service provider system 102. In another example, the forecast data 122 predicts traffic 128 to the service provider system 102, such as number of visitors, page views, and so on. The forecast data 122 may also take into account financial considerations of the service provider system 102 in providing the digital content 112, such as revenue 130 and expenses 132. In another example, the forecast data 122 predicts future digital content consumption 134, such as number of downloads, interactions, which items of digital content 112 are viewed (e.g., videos, web pages), how this interaction occurs (e.g., stream, download, browser, mobile application), and so forth. Other 136 examples of metrics that may be forecast by the forecast module involving provision of the digital content 112 by the service provider system 102 are also contemplated, including metrics describing users and user devices that interact with the digital content 112, including demographics, product descriptions, and so forth. The forecast module 120 may generate this forecast data 122 in a variety of ways, an example of which is described in greater detail in the following discussion and is shown in a corresponding figure.

Figure 2:
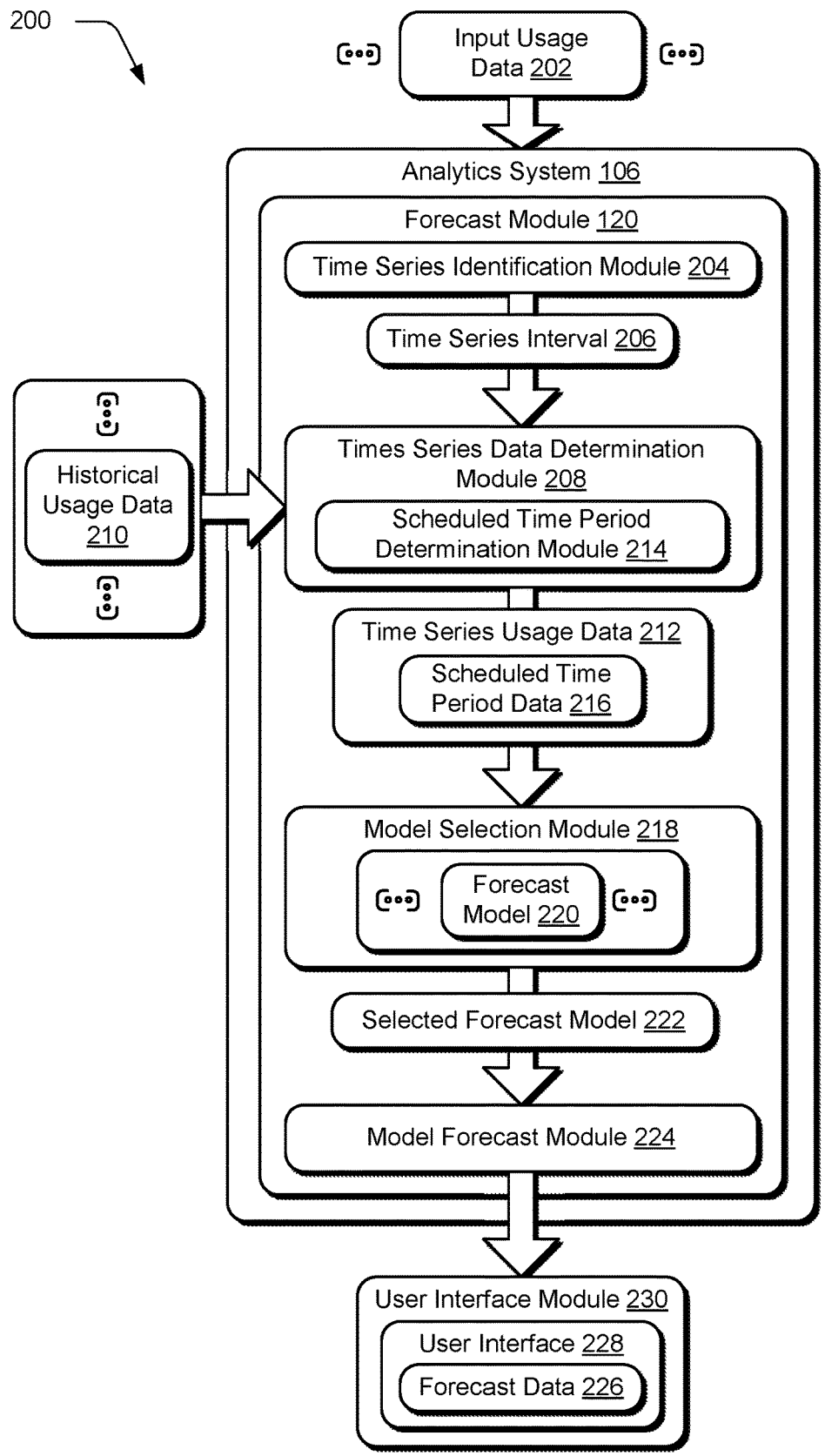
FIG. 2 depicts a system in an example implementation showing operation of a forecast module of FIG. 1 in greater detail.

FIG. 2 depicts a system 200 in an example implementation showing operation of the forecast module 120 of FIG. 1 in greater detail. To begin in this example, input usage data 202 is received by a forecast module 120. A user of the analytics system 106, for instance, may interact with a user interface of the analytics systems 106. The user interface is configured to support a flexible reporting and analytics work space in which a user may interact with usage data 116 that describes values of metrics involving provision of the digital content 112 by the service provider system 102.

The user interface, for instance, may be configured to output correlations, trends, and patterns exhibited by values of metrics of the usage data 116, which may be learned automatically and without user intervention (at least in part) by the analytics system 106 or based on manual inputs from a user. In this example, the input usage data 202 describes a subset of the usage data 116, with which, a user interacts via the user interface and thus is identified automatically and without user intervention by the analytics system 106. Other examples are also contemplated, such as to obtain the input usage data 202 as corresponding to a search query that specifies terms to be used as a basis of a forecast, e.g., a time interval, metrics, and so forth. A user, for instance, may input a search query (e.g., predict traffic for Christmas) and in response the analytics system 106 may obtain input usage data 202 from the usage data 116 that corresponds to this search query as well as any other historical usage data as further described below. As previously described, the input usage data 202 describes values of at least one metric involved in the provision of the digital content 112 by the service provider system 102.

The input usage data 202 is then processed by a time series identification module 204. The time series identification module 204 is implemented at least partially in hardware of a computing device (e.g., a processing system and computer-readable storage medium) to identify a time series interval exhibited by the input usage data 202. The time series interval 206 describes "seasonality" of a time period exhibited by the input usage data 202 based on temporal granularity and amount of time (i.e., "length" of time) of the input usage data 202. Examples of temporal granularity include hour, day, week, month, season, or year. For example, the time series interval 206 for the input usage data 202 may be set as "7*24" for hour, "7" for day, "52" for week, "12" for month, and so on. Thus, in this example the granularity of the time series interval 206 that is to serve as a basis for the forecast is based on the input usage data 202, i.e., the data with which the user is interacting via a user interface of the analytics system 106.

A time series data determination module 208 receives the time series interval 206 as an input. The time series data determination module 208 is implemented at least partially in hardware of a computing device (e.g., a processing system and computer-readable storage medium) to determine availability of the time series interval 206 in historical usage data 210. The historical usage data 210, in this example, is a portion of the usage data 116 with which the user is not currently interacting with in the user interface. Thus, the historical usage data 210 is used to bolster accuracy of a prediction when available as further described below. From this, time series usage data 212 is obtained that includes the input usage data 202 and the time series interval 206 taken from the historical usage data 210, if available.

The time series data determination module 208 is also illustrated as including a scheduled time period determination module 214. The scheduled time period determination module 214 is configured to identify whether the input usage data 202 includes a schedule time period, and if so, ensure that usage data is obtained from the historical usage data 210 that includes this scheduled time period. A scheduled time period may take a variety of forms. In one example, the scheduled time period is a calendared holiday (e.g., a particular day), such as New Year's Even, New Year's Day, Epiphany, Martin Luther King, Jr's Birthday, Groundhog Day, Chinese New Year, Mardi Gras, St. Valentine's Day, Presidents' Day, St. Patrick's Day, Easter, Passover, Cinco de Mayo, Memorial Day, Mother's Day, Father's Day, Independence Day, Dan's Birthday, Labor Day, Yom Kippur, Halloween, Election Day, Cyber Monday, Hanukkah, Mawlid al-Nabi, Christmas, Kwanzaa, and so forth. Other examples are also contemplated, such as a time for day, such as breakfast, lunch, dinner, morning, afternoon, evening, and so forth. Each of these scheduled time periods may cause changes in provision of the digital content 112 by the service provider system 102, such as how many visitors are received, revenue and expenses, consumption of computational resources, conversion rate, and so forth.

Thus, the forecast module 120 may take existence of a scheduled time period in the input usage data 202 when obtaining the historical usage data 210. For example, suppose the time series interval 206 is specified for a certain time of year (e.g., particular month like April) and includes a calendared holiday, such as Easter. Easter, however, does not fall in April in each year. Therefore, in such an example a scheduled time period determination module 214 may identify existence of the schedule time period in the input usage data 202 and obtain historical usage data 210 that also includes that scheduled time period, which is illustrated as scheduled time period data 216. In this way, the scheduled time period determination module 214 may increase accuracy of a forecast made based on this data to reflect differences in provision of the digital content 112 observed by the service provider system 102 in these time periods.

In an implementation, the time series usage data 212 is formed as a plurality of disjoint sets of data, which may increase accuracy in a forecast, reduce computational resource consumption and improve efficiency, and support real time output in the generation of the forecast. Continuing with the previous example above, input usage data 202 is obtained that is identified as corresponding to a time interval of "April." The time series data determination module 208 then obtains historical usage data 210 from a corresponding time period, e.g., the month of April, as the time series usage data 212 without including at least one intervening time interval. Thus, the time series usage data 212 is not continuous (unbroken) between the corresponding months of April. In this way, the time series usage data 212 includes data that has an increased likelihood of being relevant to the forecast and reduces an amount of data processed. This increase in efficiency may also support real time output in a user interface such that forecast data may be output as an additional "layer" over interaction of the user with the user interface of the analytics system 106 as further described in the following.

The time series usage data 212 (which may include the scheduled time period data 216) is then communicated to a model selection module 218. The model selection module 218 is implemented at least partially in hardware of a computing device to select one of a plurality of forecast models 220 as the selected forecast model 222. This selection is based on a temporal granularity of the time series usage data 212, an amount of time described by the time series usage data 212, and/or whether the time series usage data 212 includes a scheduled time period, as described by scheduled time period data 216. An example of this is further described in relation to FIG. 3.

The selected forecast model 222 is then employed by a model forecast module 224 to generate forecast data 226. The forecast data 226 includes values of metrics predicted based on the input usage data 202, the historical usage data 210 (e.g., when available), and the selected forecast model 222. In this way, the forecast data 226 is generated by a model selected as having increased accuracy based on characteristics of the data being processed. The forecast data 226 may be leveraged in a variety of ways, such as for load balancing of computational resources, targeting of digital marketing content, inventory control, and so forth. The forecast data 226, for instance, may be leveraged automatically and without user intervention by the analytics system 106 or output in a user interface 228 by a user interface module 230, e.g., as a notification, in real time during user interaction with the usage data. For example, a user may interact with a particular time interval of the usage data 116 via the user interface 228. From this, the forecast module 120 determines granularity of this interval, obtains corresponding historical usage data 210, selects a forecast model 220, and generates the forecast data 226 automatically and without user intervention using corresponding models. In this way, the forecast data 226 may be updated in real time based on user interaction automatically without requiring user input. Other examples are also contemplated, such as to obtain criteria via the user interface 228 that is to serve as a basis for the forecast, e.g., a time interval, temporal granularity, and so forth.

Figure 3:
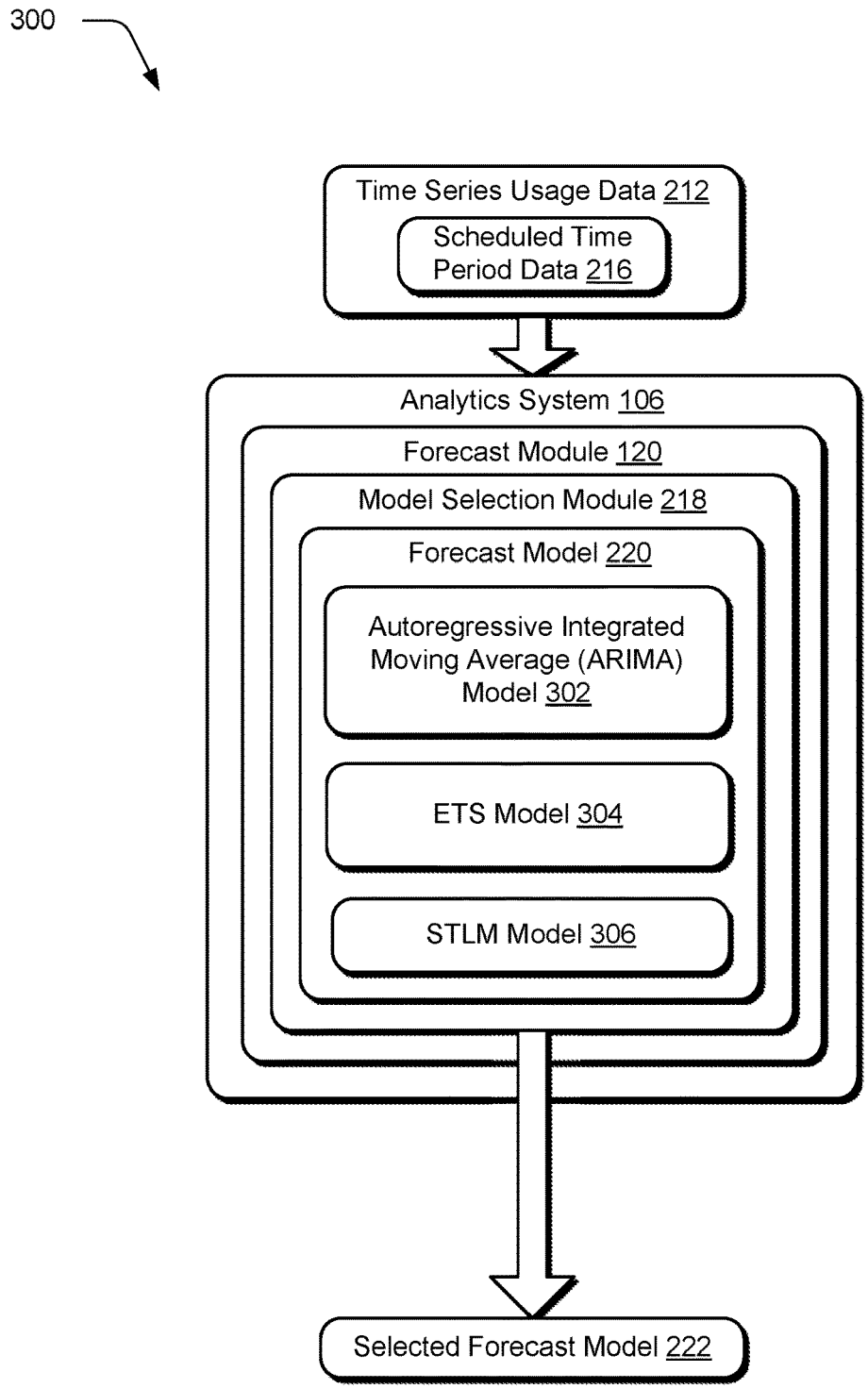
FIG. 3 depicts a system in an example implementation showing operation of a model selection module of FIG. 2 as selecting a forecast model.

FIG. 3 depicts a system 300 in an example implementation showing operation of the model selection module 218 of FIG. 2 as selecting a forecast model. As previously described, selection by the model selection model 218 is based on a temporal granularity of the time series usage data 212, an amount of time described by the time series usage data 212, and/or whether the time series usage data 212 includes a scheduled time period. From this, the model selection module 218 selects from a plurality of forecast models 220 to choose one which best fits the data in order to provide an accurate forecast.

For example, the model selection module 218 may determine that the time series usage data 212 includes disjoint usage data, year-to-year, and includes a scheduled time period as evidenced by the scheduled time period data 216. In response, the model selection module 218 fits an autoregressive integrated moving average (ARIMA) model 302. This model 302 is fitted to time series data (e.g., the time series usage data 212) having disjoint sets to predict future points in time in the series, i.e., to forecast values of metrics in the future. The ARIMA model 302 is configured such that an evolving variable of interest is regressed on its own lagged values and a regression error is formed as a linear combination of error terms whose values occurred contemporaneously and at various times in the past, and that data values have been replaced with the difference between their values and previous values.

If however, the time series usage data 212 does not include disjoint usage data, year-to-year and include a schedule time period as evidenced by the scheduled time period data 216, another model is selected. For example, if the granularity of the time series usage data 212 is "day," then the model selection module 218 selects an ETS model 304. The ETS model 304 refers to three components, error, trend, and seasonality (e.g., the time intervals above). The ETS model 304 may be configured as an additive error model or multiplicative error model, e.g., to address errors, a damped multiplicative trend, and multiplicative seasonality.

If the time series usage data 212 has a granularity of hour, week, or month and does include scheduled time period data 216, then an STLM model 306 is selected. The STLM model 306 combines forecasting with seasonal decomposition and thus may address inclusion of scheduled time period data 216 within the time series usage data 212. If, on the other hand, the time series usage data 212 has a granularity of hour, week, or month and does not include scheduled time period data 216, then the ARIMA model 302 is selected and fit to the time series usage data 212 that does not include a corresponding time interval from the historical usage data 210. In other words, this forecast model 220 is fit to the input usage data 202 that is available and thus the forecast module 120 may adapt to both temporal granularity as well as data availability.

FIG. 4 depicts an example of an algorithm 400 that may be employed by the model selection module 218 to select one of the plurality of forecast models 220. This algorithm 400 follows the example of FIG. 3 and also includes an option to specify a level of accuracy against Type I and/or Type II errors (i.e., false positives and false negatives, respectively), which is illustrated as "prediction.level." Thus, in the above metric forecasting techniques in a digital medium environment are described in which forecast data is generated that predicts a value of a metric involving provision of digital content by a service provider system. In this way, insight may be gained into future operations of the service provider system, such as number of visitors, computational resource consumption, revenue, expenses, digital content consumption, and other metrics.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
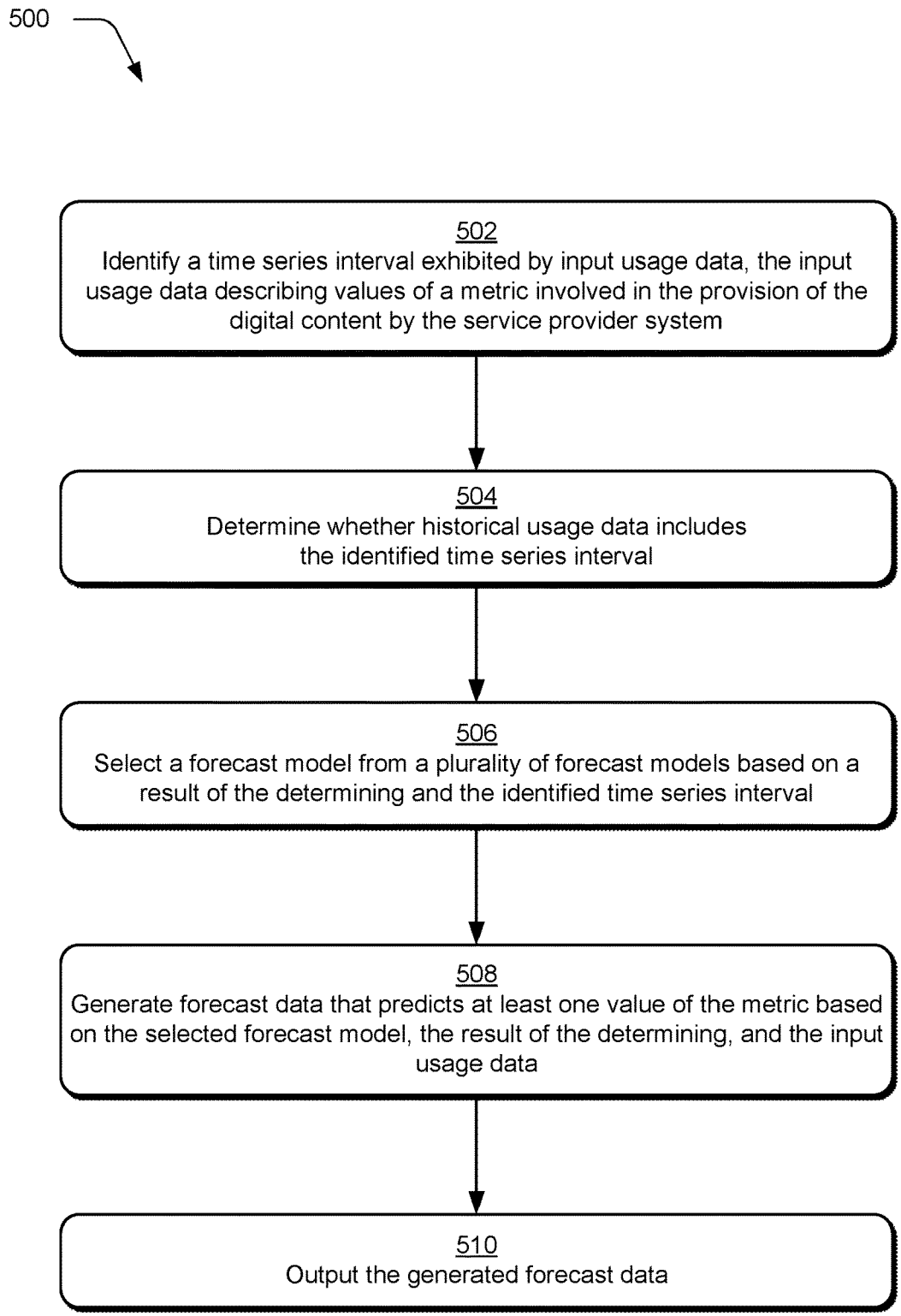
FIG. 5 is a flow diagram depicting a procedure in an example implementation in which forecast data is generated to predict future values of a metric involving provision of digital content by a service provider system.

FIG. 5 depicts a procedure 500 in an example implementation in which forecast data is generated to predict future values of a metric involving provision of digital content by a service provider system. A time series interval is identified by an analytics system that is exhibited by input usage data. The input usage data describes values of a metric involved in the provision of the digital content by a service provider system (block 502). The input usage data 202, for instance, may be identified by monitoring user interaction with a user interface of the analytics system 106, obtained as a result of a search query, and so forth. Thus, the time series identification module 204 may determine the time series interval 206 from the input usage data 202 or from a query (e.g., forecast query) entered by a user.

A determination is then made by the analytics system as to whether historical usage data includes the identified time series interval (block 504). The time series data determination module 208 then determines whether historical usage data 210, e.g., from a different period of time such as a year, is available that corresponds to a time series interval 206 identified by the time series identification module 204.

A forecast model is then selected by the analytics system from a plurality of forecast models based on a result of the determination and the identified time series interval (block 506). The model selection module 218, for instance, may select from a plurality of forecast models 220 based on temporal granularity of the input usage data 202, availability of historical usage data 210, and inclusion of scheduled time period data 216 as described in relation to FIG. 3.

Forecast data is then generated by a forecast module of the analytics system by fitting the selected forecast model 222 to the time series usage data 212. The forecast data is configured to predict at least one value of the metric based on the selected forecast model, a result of the determination, and the input usage data (block 508). The generated forecast data is then output by the analytics system (block 510), e.g., for output in a user interface 228 by a user interface module 230, for use in initiating actions automatically and without user intervention (e.g., for computational resource provisioning, inventory control, and so on) by the service provider system 102, and so on.

Example System and Device

Figure 6:
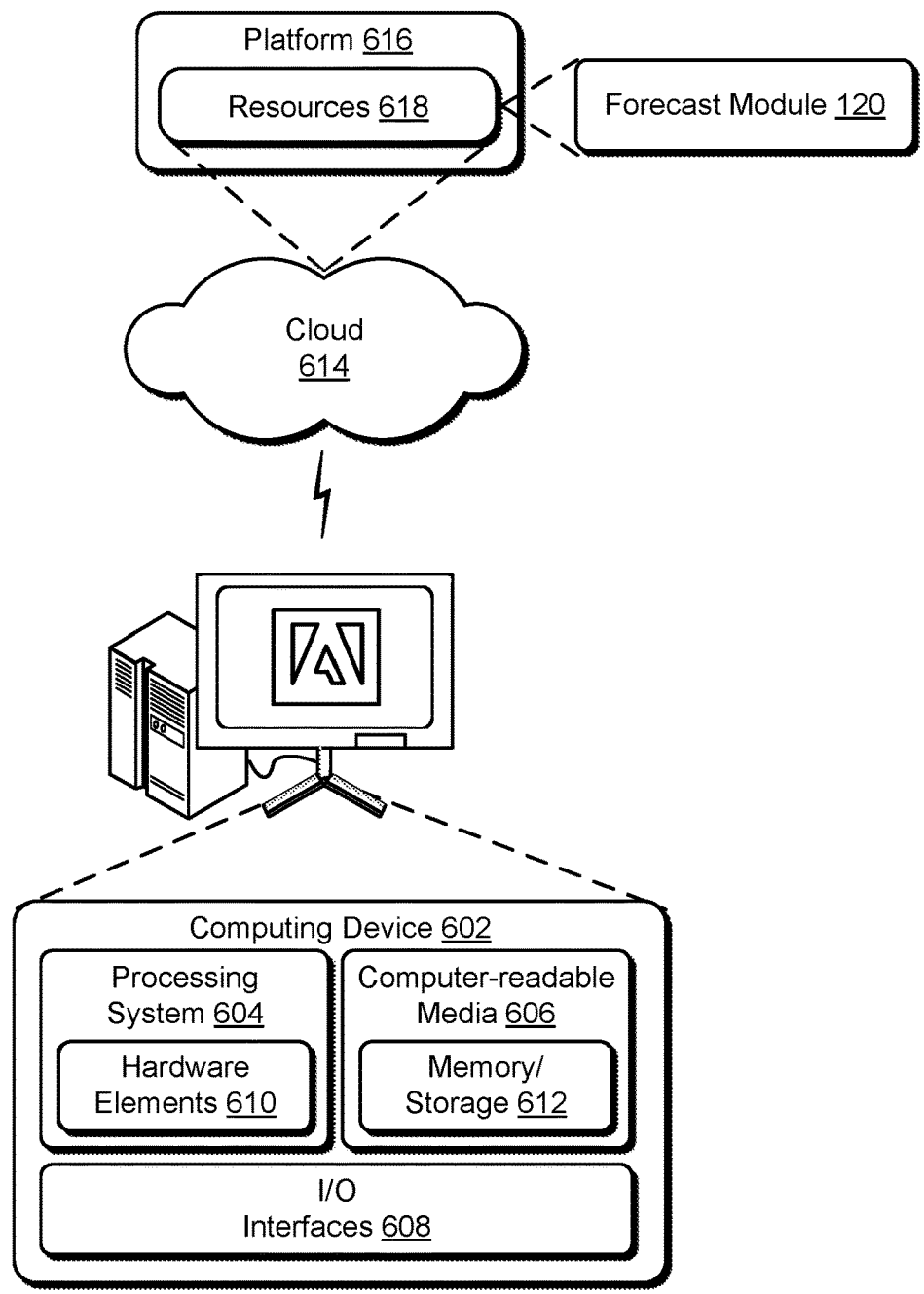
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the forecast module 120. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment forecast environment, a method implemented by a computing device of an analytics system, the method comprising:
   receiving, by the computing device of the analytics system, input usage data via a network from computing devices of a service provider system, the input usage data describing consumption of computational resources of the computing devices of the service provider system in provision of digital content via the network to client devices, the consumption described using values of a metric;
   displaying, by the computing device of the analytics system, the input usage data in a user interface;
   receiving, by the computing device of the analytics system, an input involving user interaction with the input usage data displayed in the user interface;
   identifying, responsive to the input by the computing device automatically and without user intervention by the analytics system, a time series interval exhibited by the input usage data;
   obtaining, by the computing device of the analytics system, data from historical usage data, the historical usage data also includes the identified time series interval;
   selecting, by the computing device of the analytics system, a forecast model from a plurality of forecast models based on the identified time series interval;
   generating, by the computing device automatically and without user intervention responsive to the selecting, forecast data that predicts at least one value of the metric that is learned by the analytics system based on the selected forecast model, the data from the historical usage data for the identified time series interval, and the input usage data for the identified time series interval;
   outputting, by the computing device of the analytics system responsive to the generating, the generated forecast data in real time in the user interface; and
   controlling, by the computing device of the analytics system, consumption of computational resources of the computing devices of the service provider system in provision of subsequent digital content via the network to the client devices based on the generated forecast data.

2. The method as described in claim 1, wherein the generating and the outputting are performed in real time as the input usage data is received.

3. The method as described in claim 1, wherein the input usage data and the historical usage data form disjoint sets of data, one to another.

4. The method as described in claim 1, wherein the selecting is based at least in part on temporal granularity and an amount of time described by the input usage data.

5. The method as described in claim 4, wherein the temporal granularity includes hour, day, week, month, season, or year.

6. The method as described in claim 1, wherein the historical usage data describes values of the metric involved in the provision of the digital content by the service provider system.

7. The method as described in claim 1, wherein the identifying includes determining whether the input usage data includes a scheduled time period and wherein the selecting and the generating are based at least in part on a result of the determining.

8. The method as described in claim 7, wherein the scheduled time period is a calendared holiday.

9. The method as described in claim 1, wherein the controlling includes controlling load balancing of the computational resources of the computing devices of the service provider system in the provision of the subsequent digital content.

10. In a digital medium environment forecast environment, a system comprising:
    a processor; and
    a computer-readable storage medium having instructions stored thereon that, responsive to execution by the processor, causes the processor to perform operations including:
      receiving input usage data via a network from computing devices of a service provider system, the input usage data describing consumption of computational resources of the computing devices of the service provider system in provision of digital content via the network to client devices, the consumption described using values of a metric;
      displaying the input usage data in a user interface;
      receiving an input involving user interaction with the input usage data displayed in the user interface;
      identifying, responsive to the input automatically and without user intervention, a time series interval exhibited by the input usage data;
      obtaining data from historical usage data that also includes the identified time series interval;

selecting a forecast model from a plurality of forecast models based on the identified time series interval;

generating, automatically and without user intervention responsive to the selecting, forecast data that predicts at least one value of the metric that is learned based on the selected forecast model, the data from the historical usage data for the identified time series interval, and the input usage data for the identified time series interval; and controlling load balancing of the computational resources of the computing devices of the service provider system in provision of subsequent digital content via the network to the client devices based on the generated forecast data.

11. The system as described in claim 10, wherein the generating is performed in real time as the input usage data is received.

12. The system as described in claim 10, wherein the input usage data and the historical usage data form disjoint sets of data, one to another.

13. The system as described in claim 10, wherein the selecting is based at least in part on temporal granularity and an amount of time described by the input usage data.

14. The system as described in claim 13, wherein the temporal granularity includes hour, day, week, month, season, or year.

15. The system as described in claim 10, wherein the historical usage data describes values of the metric involved in the provision of the digital content by the service provider system.

16. The system as described in claim 10, wherein the identifying includes determining whether the input usage data includes a scheduled time period and wherein the selecting and the generating are based at least in part on a result of the determining.

17. The system as described in claim 16, wherein the scheduled time period is a calendared holiday.

18. In a digital medium environment forecast environment, a method implemented by a computing device of an analytics system, the method comprising:

receiving, by the computing device of the analytics system, input usage data via a network from computing devices of a service provider system, the input usage data describing consumption of computational resources including processing, memory, and network resources of the computing devices of the service provider system, the consumption described using values of a metric;

identifying, responsive to the input by the computing device of the analytics system automatically and without user intervention, a time series interval exhibited by the input usage data;

obtaining, by the computing device of the analytics system, data from historical usage data that also includes the identified time series interval;

selecting, by the computing device of the analytics system, a forecast model from a plurality of forecast models based on the identified time series interval;

generating, by the computing device of the analytics system automatically and without user intervention responsive to the selecting, forecast data that predicts at least one value of the metric that is learned by the analytics system based on the selected forecast model, the data from the historical usage data for the identified time series interval, and the input usage data for the identified time series interval; and controlling, by the computing device of the analytics system, load balancing of the computational resources including processing, memory, and network resources of the computing devices of the service provider system based on the generated forecast data learned by the analytics system using the selected forecast model, the data from the historical usage data for the identified time series interval, and the input usage data for the identified time series interval.

19. The method as described in claim 18, wherein the selecting is based at least in part on temporal granularity and an amount of time described by the input usage data.

* * * * *